(12) United States Patent
Zhou et al.

(10) Patent No.: US 10,978,871 B2
(45) Date of Patent: Apr. 13, 2021

(54) RECONFIGURABLE FRONT END CONVERTER FOR FULL POWER ENERGY STORAGE APPLICATIONS

(71) Applicant: GE Energy Power Conversion Technology Ltd, Rugby (GB)

(72) Inventors: Zhi Zhou, Niskayuna, NY (US); Dong Dong, Niskayuna, NY (US)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 176 days.

(21) Appl. No.: 15/810,277

(22) Filed: Nov. 13, 2017

(65) Prior Publication Data

US 2019/0148939 A1 May 16, 2019

(51) Int. Cl.
| *H02J 1/12* | (2006.01) |
| *H02J 7/34* | (2006.01) |
| *H02M 3/158* | (2006.01) |
| *H02M 7/797* | (2006.01) |
| *H02M 7/81* | (2006.01) |
| *H02M 3/335* | (2006.01) |
| *H02J 7/02* | (2016.01) |
| *H02M 7/493* | (2007.01) |
| *H02M 1/00* | (2006.01) |

(52) U.S. Cl.
CPC ................. *H02J 1/12* (2013.01); *H02J 7/34* (2013.01); *H02M 3/1582* (2013.01); *H02M 7/797* (2013.01); *H02J 7/022* (2013.01); *H02M 3/33584* (2013.01); *H02M 7/493* (2013.01); *H02M 7/81* (2013.01); *H02M 2001/007* (2013.01)

(58) Field of Classification Search
CPC ................ H02M 2001/007; H02M 2001/0077
See application file for complete search history.

(56) References Cited

U.S. PATENT DOCUMENTS

| 8,971,063 B2 * | 3/2015 | Knill .................... H02M 3/3374 |
| | | 323/266 |
| 9,270,191 B2 * | 2/2016 | Chisenga ................. H02J 3/383 |
| 9,461,554 B2 * | 10/2016 | Fu ........................ H02M 3/1582 |
| 9,614,442 B2 * | 4/2017 | Chen ...................... H02M 3/158 |
| 9,653,207 B2 * | 5/2017 | Madawala .............. H02J 7/025 |
| 10,381,967 B2 * | 8/2019 | Lee ....................... H02M 1/4225 |
| 2009/0080225 A1 * | 3/2009 | Dijkhuizen ........... H02M 7/537 |
| | | 363/65 |

* cited by examiner

*Primary Examiner* — Gary L Laxton
(74) *Attorney, Agent, or Firm* — Wood IP LLC

(57) ABSTRACT

Provided is a power distribution system that includes a reconfigurable DC/DC power converter configured to be connected with an energy storage device at an input end for receiving an input voltage therefrom, and a power electronics building block having a primary bridge unit, a secondary bridge unit magnetically connected with the primary bridge unit, and an outer bridge unit at an output end and connected to an output of the secondary bridge unit, configured to output an output voltage.

17 Claims, 5 Drawing Sheets

RECONFIGURABLE FRONT END CONVERTER FOR FULL POWER ENERGY STORAGE APPLICATIONS

I. TECHNICAL FIELD

The present invention relates generally to full power electronic building blocks (PEBB) in energy storage applications. In particular, the present invention relates to configuring a front-end converter for a PEBB in energy storage applications.

II. BACKGROUND

A conventional PEBB for energy storage integration includes three conversion stages. As shown in FIG. 1, a PEBB 100 typically includes a plurality of direct current (DC)-DC, DC-AC (alternating current) bridge units (e.g., H-bridges) 80, 90, and 95 connected in series within the three conversion stages, for DC-to-DC or DC-to-AC applications. The PEBB 100 further includes a transformer 85 used to magnetically couple the primary bridge unit 80 to the secondary bridge unit 90. An energy storage (ES) device is connected at the input side to the primary bridge unit 80. Further, the outer bridge unit 95 is used to regulate/control DC or AC voltages on an output or distribution side.

Once the energy storage and PEBB are designed, the system is performed with the fixed energy storage medium and voltage range. For applications with different DC or AC voltages, for example, 4160 V AC or 6 kV DC, the number of PEBB least/line replaceable units (LRUs) required will be different. Thus, a different system design is required.

III. SUMMARY OF THE EMBODIMENTS

Given the aforementioned deficiencies, needed is a reconfigurable front end or energy storage end converter for a PEBB for energy storage in DC/DC, DC/AC, AC/DC or AC/AC applications, that converts the input DC or AC into DC before feeding it into DC/DC converters/transformer. Embodiments of the present invention provide multiple options/functions/features without changing the hardware (design and build) but with re-definable software for a wide variety of energy storage devices (e.g. batteries, ultra-capacitors, or fuel cells etc.).

In embodiments of the present invention, a power distribution system is provided. The system includes a plurality of modular and scalable power electronics building blocks (PEBBs), connected in parallel and/or in series at the input end and output end respectively. Each PEBB, a least/line replaceable unit (LRU), includes a reconfigurable DC/DC power converter configured for connection with an energy storage device at an "input" end for receiving an input voltage therefrom. A power electronics building block is provided having a primary bridge unit. Also included is a secondary bridge unit magnetically connected via a high frequency transformer with the primary bridge unit, and an outer bridge unit at an "output" end and connected to an output of the secondary bridge unit, configured to output an output voltage. The input end and output end are used in relative sense since the power system built on PEBBs is bi-directional.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

IV. DESCRIPTION OF THE DRAWINGS

Figure 1:
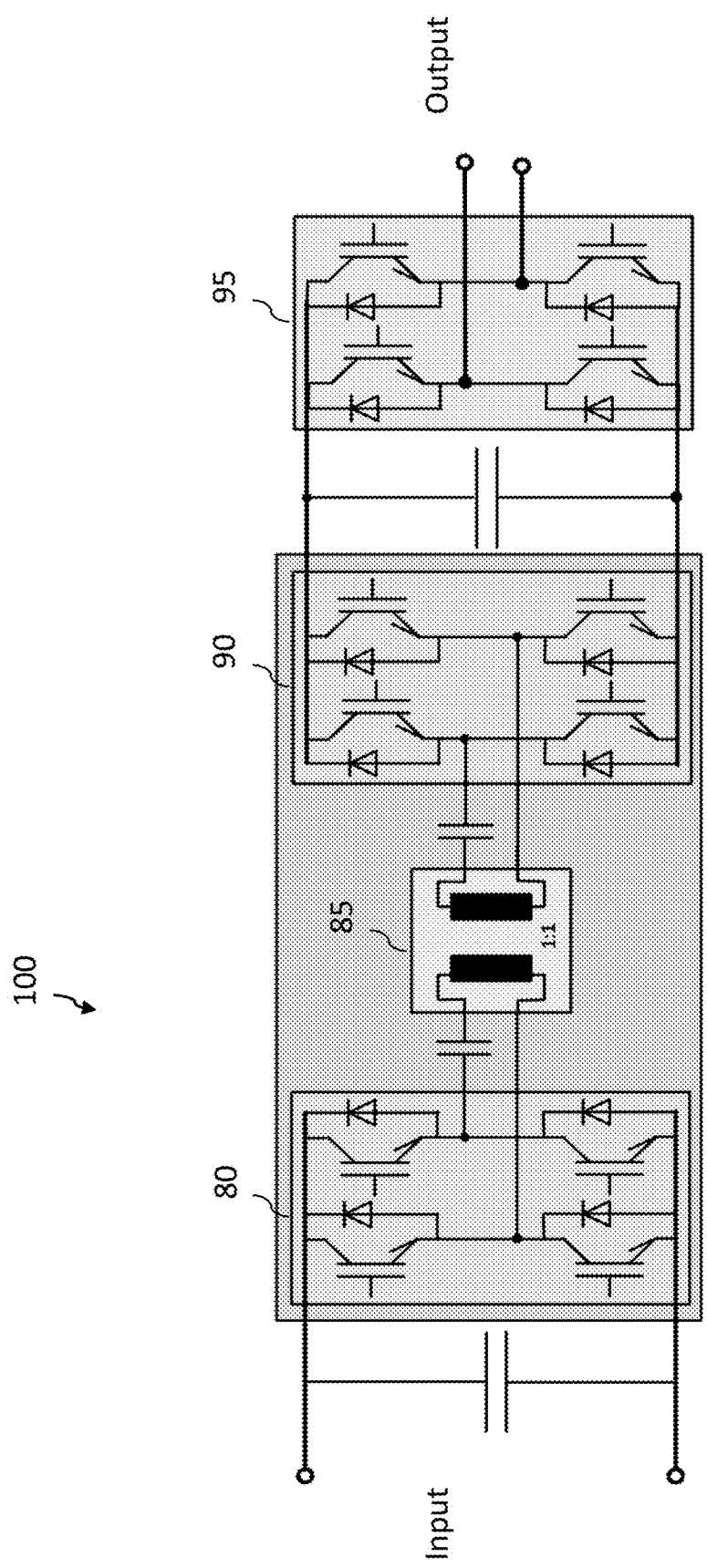
FIG. 1 is a schematic illustrating a conventional PEBB.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

V. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components.

In other instances, well-known components, apparatuses, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

As noted above, the embodiments provide a reconfigurable DC/DC converter (buck-boost, buck, or boost) at the ES/front-end for energy storage applications. The converter is reconfigurable for DC/DC, DC/AC, AC/DC or AC/AC applications. Power electronics building block (PEBB) is a building block for a power converter. The PEBB is modular and scalable, and therefore a many PEBBs as desired can be stacked and connected in parallel or series to obtain a desired voltage level and power level.

The embodiments of the present invention will now be discussed with reference to FIGS. 2-5.

Figure 2:
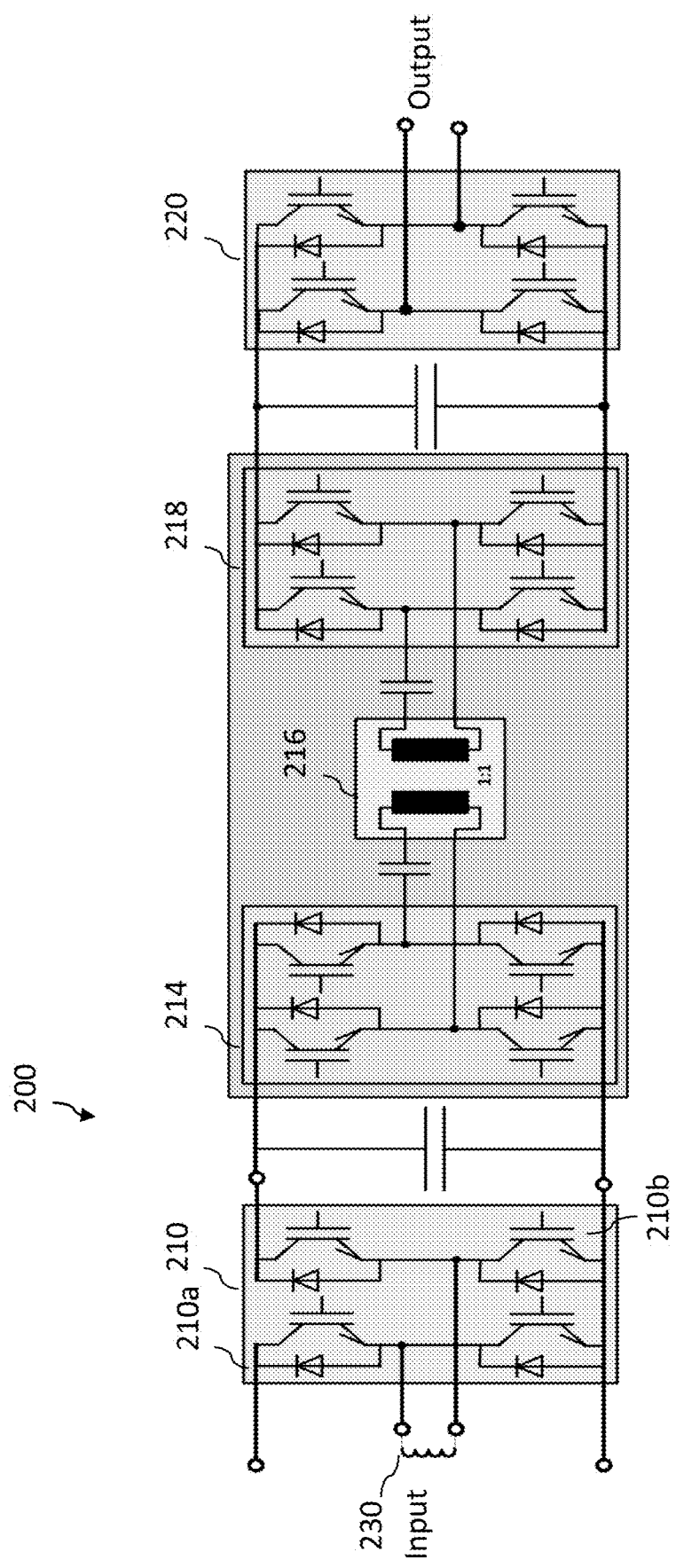
FIG. 2 is a schematic illustrating an exemplary PEBB having a reconfigurable front end converter configured as a buck-boost converter that can be implemented within one or more embodiments of the present invention.

FIG. 2 illustrates one exemplary embodiment, having an ES/front-end (left) DC/DC converter configured as a buck-boost converter. The buck-boost converter has the ability to buck (i.e., reduce) and boost (i.e., increase) energy storage voltages based on a state of the voltage of the energy storage device. Accordingly, a wide range of voltages of the energy storage device can be used.

As depicted in FIG. 2, a power distribution system (i.e., a PEBB) 200 includes a reconfigurable power converter 210 at a front end (i.e., input) of the system 200. The PEBB 200 also includes a primary bridge unit 214 and a secondary bridge unit 218 magnetically connected together by a transformer 216, and an outer bridge unit 220 connected to an output of the system 200. The reconfigurable power converter 210 is configured as a buck-boost converter in FIG. 2.

The primary bridge unit 214 converts the voltage from DC to AC, the secondary bridge unit 218 converts it back to DC, and the outer bridge unit 220 converts the voltage from DC to DC for DC applications or from DC to AC for AC applications. The PEBB depicted in FIG. 2 is a bi-directional power system. The energy and power flow can be reversed from the output end to the energy storage end to charge a depleted energy storage device or to capture a regenerative or excess energy from the output end to the energy storage/input end. The energy storage device connected to the PEBB based power system can therefore act as a source or load with respect to the power system.

According to the embodiments, the reconfigurable power converter 210 is connected with an energy storage device (e.g., the battery energy storage device 310 in FIG. 3) at the front end. An inductor 230 is connected across the power converter 210.

In the reconfigurable power converter 210, half bridge unit 210a operates to buck (i.e., to reduce) the input voltage down, and is connected to the inductor 230 and the second half bridge unit 210b, to boost the voltage. Therefore if the energy storage device (e.g., as a battery) connected at the front end is charged and discharged, and the voltage is varied the input end, it can be maintained as constant at the output end of the power converter 210 and input into the primary power converter (i.e., primary bridge unit) 214.

By way of example, if the output of the power converter 210 (i.e., the buck-boost DC/DC converter) is designed to be set at approximately 500 volts (V), then the input voltage of the energy storage device can vary from approximately 200 V to approximately 1000V. The voltage can be bucked or boosted in either direction, thus the buck-boost converter can maintain the output voltage.

Figure 3:
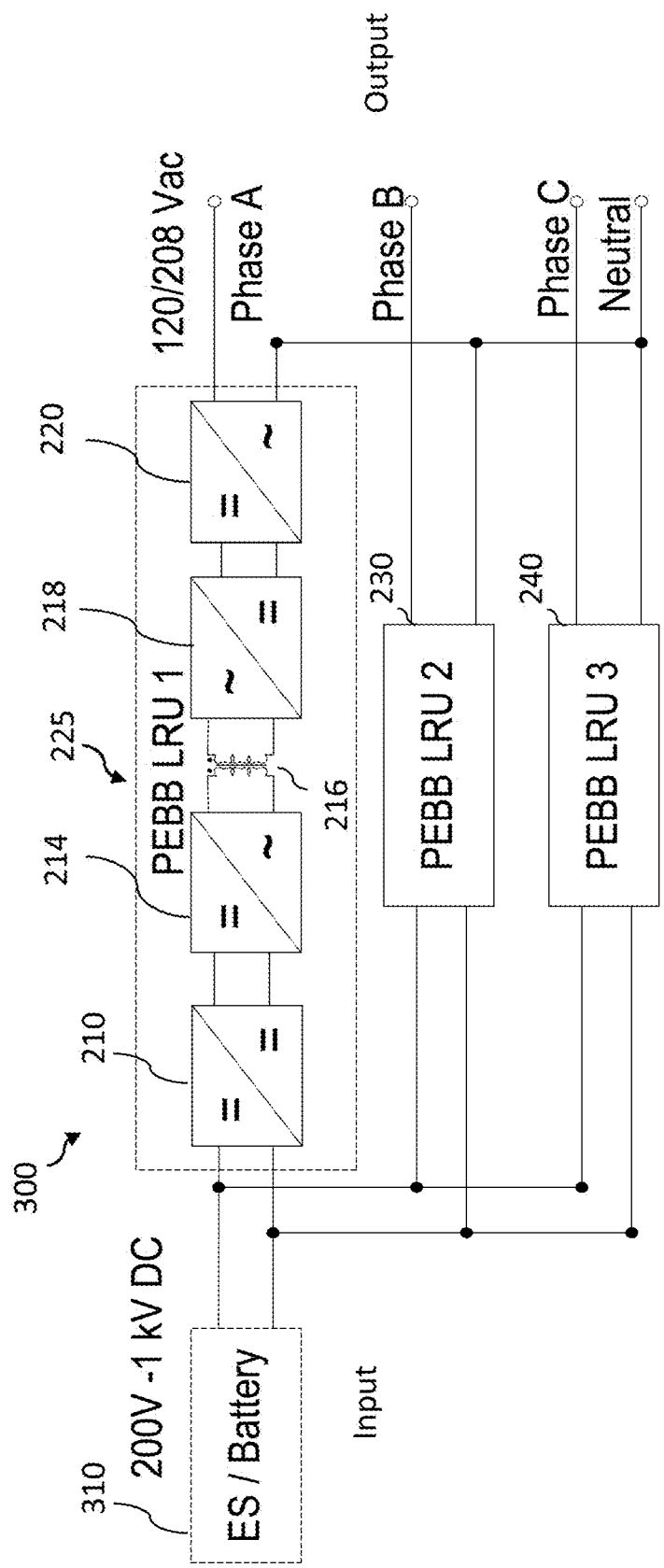
FIG. 3 is a schematic illustrating an example of a low voltage AC power system with battery energy storage integrated via a plurality of stackable PEBBs each including a front end/energy storage buck-boost converters at the DC/DC conversion stage, that can be implemented within one or more embodiments of the present invention.

FIG. 3 is an example of a low voltage AC power system 300 with battery energy storage 310 integrated via a plurality of stacked PEBBs least/line replaceable units (LRUs). Each LRU uses a buck-boost DC/DC power converter 210 to increase or decrease the voltage before it's fed it into each PEBB LRUs 225, 230, and 240. Each PEBB LRU 225, 230, and 240 is similar to the power distribution system 200 shown in FIG. 2.

Each PEBB LRU 225, 230, and 240 includes the power converter 210 at a front end adjacent to the battery energy storage 310. A connection is provided to a primary power converter 214 magnetically connected with a secondary power converter (i.e., secondary bridge unit) 218 via a transformer 216. An outer bridge unit 220 is connected to each phase A, B, and C of the output. The input voltage at the battery energy storage can range from approximately 200 V to 1000 V DC voltage, and can be converted to approximately 120/208 AC voltage at the output as shown.

As shown in FIG. 3, the primary bridge unit 214 converts the voltage from DC to AC, and the secondary bridge unit 218 converts it back to DC. The outer bridge unit 220 converts the voltage from DC to AC for AC applications. As an exemplary example, for energy storage devices rated below 500V, the buck-boost DC/DC power converter 210 can be software-configured to run as a boost converter. As another exemplary example, for energy storage devices rated between 500V to 1000V, the buck-boost DC/DC power converter 210 can be software-configured to run as a buck converter. This software-configurable buck and boost capability/functionality is also applicable to one energy storage device whose voltage varies as a function of state of charge during charge or discharge.

Figure 4:
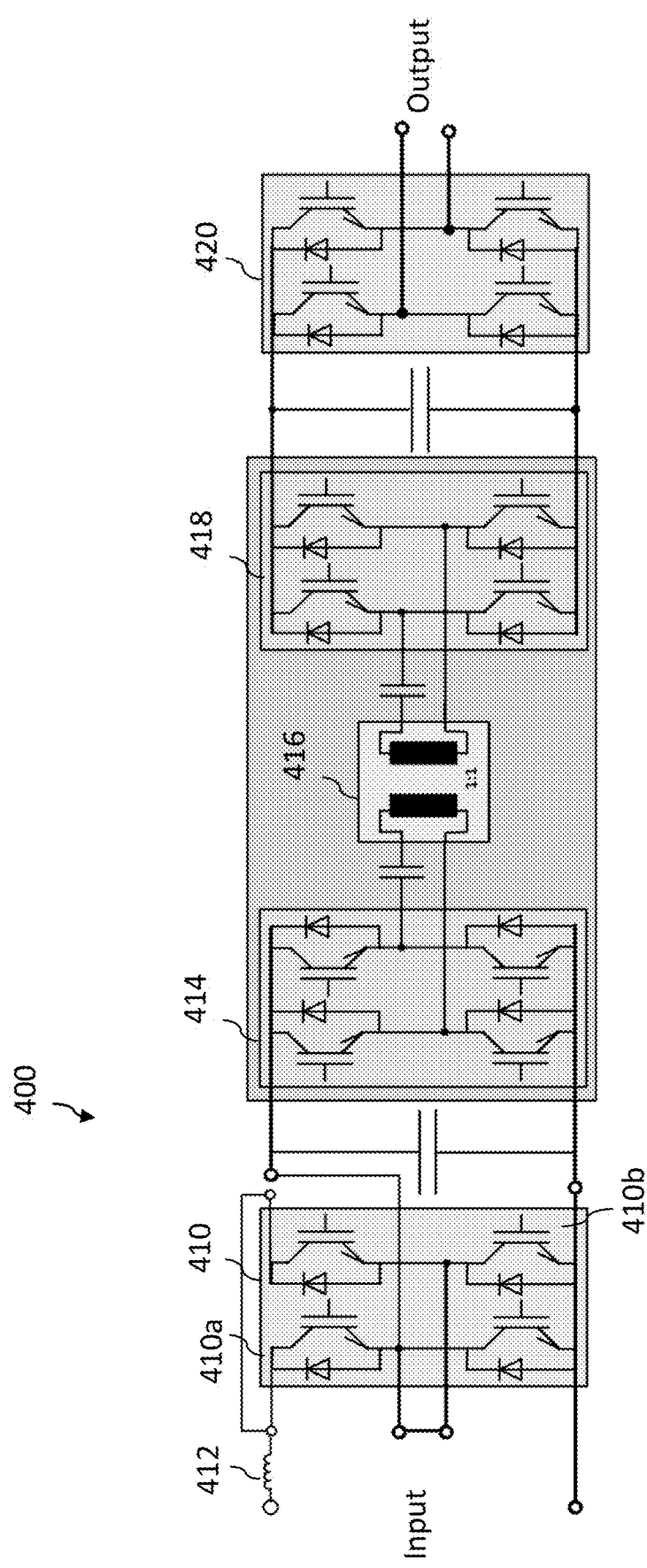
FIG. 4 is a schematic illustrating a second exemplary embodiment of the invention with a PEBB including the reconfigurable converter configured as a buck converter that can be implemented within the embodiments.

FIG. 4 is a schematic illustrating a second exemplary embodiment of the invention with the reconfigurable front end DC/DC converter 410 configured as a buck converter in a power distribution system (e.g., PEBB) 400. In FIG. 4, the energy storage device (e.g., input) and PEBB 400 are designed so that a bucked output voltage is desirably always lower than the energy storage voltage. The bucked output voltage is lower at all times throughout the entire operating range of the energy storage device, regardless of a state and/or the type of energy storage device.

As indicated, the PEBB 400 includes a reconfigurable power converter 410 operating as a buck converter. In the power converter 410, the first and second half bridge units 410a and 410b are tied together. The first half bridge unit 410a, which receives the input voltage, is connected to an inductor 412 to buck (i.e. reduce) the input voltage.

The reduced voltage is input into the primary bridge unit 414, which is magnetically connected to the secondary bridge unit 418 by a transformer 416. The reduced input voltage is maintained throughout the PEBB 400, thus keeping the output voltage at the outer bridge unit 420 at a voltage range less than the input voltage in particular applications. As an exemplary example of this embodiment, a fixed energy storage device with rated voltage is greater than 500V, the front end, reconfigurable power converter 410 can be hardware-configured as a buck converter to simplify the configurable options.

Figure 5:
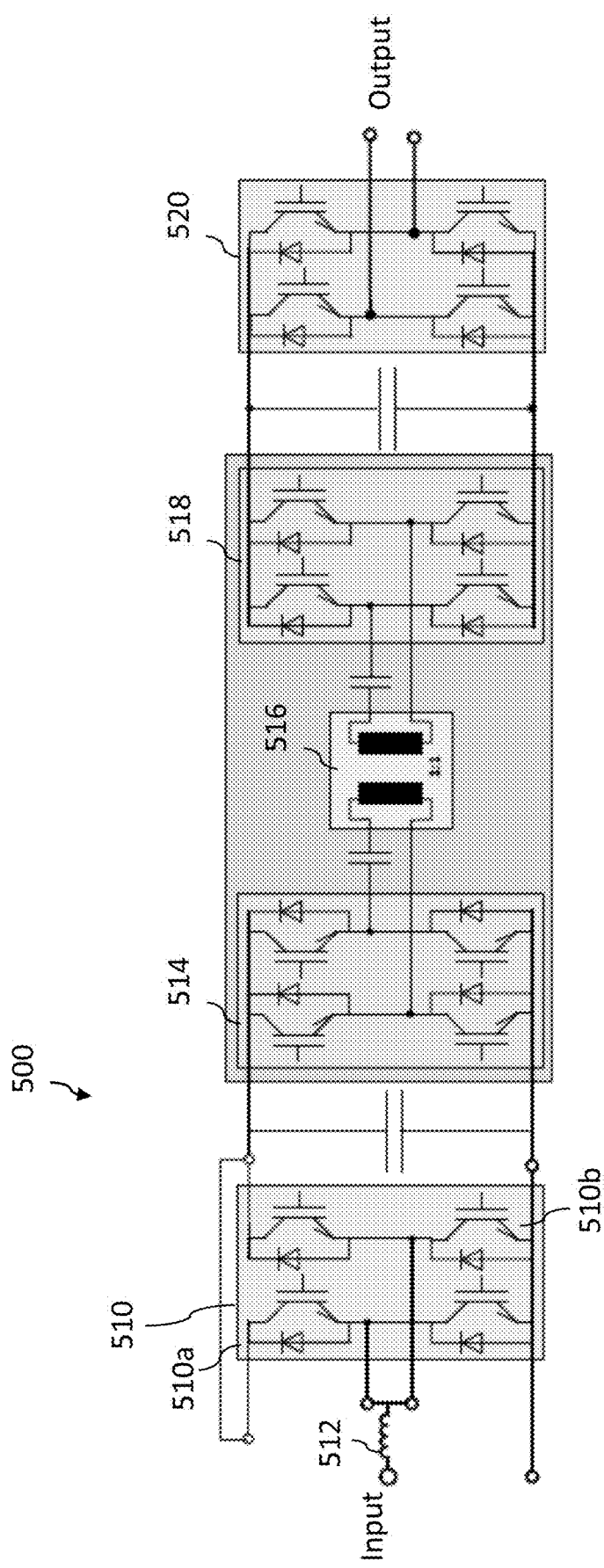
FIG. 5 is a schematic illustrating a third exemplary embodiment of the invention with a PEBB including the reconfigurable front end converter configured as a boost converter that can be implemented within the embodiments.

FIG. 5 is a schematic illustrating a third exemplary embodiment of the invention with a reconfigurable front end DC/DC power converter 510 configured as a boost converter within a PEBB 500. In FIG. 5, the PEBB 500 and an energy storage device are designed so that the boosted output voltage is always higher than the energy storage voltage at all times throughout the entire operating range of the energy storage device. As shown, in the power converter 510, the first and second half bridge units 510a and 510b are connected together with an inductor 512.

The power converter 510 receives the input voltage and boosts (i.e. increases) the input voltage to be input into a primary bridge unit 514, which is magnetically connected with a secondary primary unit 518 via a transformer 516. The output voltage at the outer bridge unit 520 is maintained at a higher voltage range than the input voltage. As an exemplary example of this embodiment, a fixed energy storage device with rated voltage is less than 500V, the front end DC/DC converter 510 can be hardware-configured as a boost converter to simplify the configurable options.

Embodiments of the present invention provide a reconfigurable front end/energy storage end converter for reconfiguring a PEBB for DC to DC and DC to AC energy storage applications. This DC/DC stage can be configured as buck-boost, buck, or boost converters. Thus, the energy storage medium can have a wide range of options, including use for different chemistry/technology, as well as various voltage levels and devices.

Use of the reconfigurable front end converter makes the PEBB fully modular, scalable, and flexible. Additional advantages include enabling energy storage agnostic integration, improving control stability of PEBB, enabling split of active power link module (APLM) containing ultracapacitor and power electronics & load and battery energy storage (BES) tied to separate sides of the buck-boost conversion stage.

Other advantages of reconfigurable front end converters include better utilization of APLMs while maintaining fast response times to support pulse loads, reducing the number of LRUs required for DC and AC applications, and use of lower cost and lower voltage (e.g. 600V or 900V) rated IGBT's or MOSFET's. The reconfigurable front end converters are retrofitable to existing PEBBs, and reconfigurable for various uses with minimum hardware changes/reconfigurations.

This written description uses examples to disclose the invention including the best mode, and also to enable any person skilled in the art to practice the invention, including making and using any devices or apparatuses and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power distribution system comprising:
a reconfigurable DC/DC power converter (i) comprising an inductor connected between a first half bridge unit and a second half bridge unit of the reconfigurable DC/DC power converter and (ii) configured for connection to an energy storage device at an input end of the power converter, the input end being configured to receive an input voltage therefrom; and
a power electronics building block comprising:
a primary bridge unit connected to an end opposite the input end of the power converter;
a secondary bridge unit magnetically connected to the primary bridge unit; and
an outer bridge unit located at an output end and connected to an output of the secondary bridge unit via a capacitor, the outer bridge being configured to output an output voltage;
wherein a flow of energy between the energy storage device and the outer bridge unit is bi-directional; and
wherein the reconfigurable DC/DC power converter, via the inductor, is configured to operate as a buck-boost converter to reduce the voltage at the first half bridge unit and increase the voltage at the second half bridge.

2. The power distribution system of claim 1, further comprising a plurality of power electronics building blocks stacked together, wherein each includes the reconfigurable power converter connectable to the energy storage device.

3. The power system of claim 2, wherein the stacked plurality of power electronics building blocks including the reconfigurable front end DC/DC converter are connected in parallel at the input end.

4. The power system of claim 2, wherein the stacked plurality of power electronics building blocks including the reconfigurable front end DC/DC converter are connected in parallel at both the input end and at the output end.

5. The power system of claim 2, wherein the stacked plurality of power electronics building blocks including the reconfigurable front end DC/DC converter are connected in parallel at the input end and in series at the output end.

6. The power distribution system of claim 1, further comprising an inductor connected with a first half bridge unit of the reconfigurable DC/DC power converter, and the first half bridge unit is connected with a second half bridge unit thereof, wherein the reconfigurable DC/DC power converter is configured to operate as a buck converter to reduce the input voltage input into the primary bridge unit.

7. The power distribution system of claim 1, further comprising an inductor connected to a first half bridge unit and a second half bridge unit of the reconfigurable DC/DC power converter, wherein the reconfigurable DC/DC power converter is configured to operate as a boost converter to increase the input voltage input into the primary bridge unit.

8. The power distribution system of claim 1, wherein the energy storage device comprises one of a battery, an ultracapacitor, a fuel cell, or any combination of thereof.

9. The power distribution system of claim 1, wherein the primary bridge unit comprises a DC/AC power converter and the secondary bridge unit comprises an AC/DC converter, and the outer bridge unit comprises a DC/AC converter.

10. A power system comprising:
a power distribution system comprising:
a reconfigurable DC/DC power converter (i) comprising an inductor connected between a first half bridge unit and a second half bridge unit of the reconfigurable DC/DC power converter and (ii) configured for connection to an energy storage device at an input end of the power converter, the input end being configured to receive an input voltage therefrom; and
a power electronics building block comprising:
a primary bridge unit connected to an end opposite the input end of the power converter;
a secondary bridge unit magnetically connected to the primary unit; and
an outer bridge unit located at an output end and connected to an output of the secondary bridge unit via a capacitor, the outer bridge being configured to output an output voltage;
wherein a flow of energy between the energy storage device and the outer bridge unit is bi-directional; and
wherein the reconfigurable DC/DC power converter, via the inductor is configured to operate as a buck-boost converter to reduce the voltage at the first half bridge unit and increase the voltage at the second half bridge.

11. The power system of claim 10, further comprising a plurality of power electronics building blocks stacked together wherein, each includes the reconfigurable power converter connectable to the energy storage device.

12. The power system of claim 11, wherein the stacked plurality of power electronics building blocks including the reconfigurable front end DC/DC converter are connected in parallel at both the input side and at the output end.

13. The power system of claim 10, further comprising an inductor connected with a first half bridge unit of the reconfigurable DC/DC power converter, and the first half bridge unit is connected with a second half bridge unit thereof, wherein the reconfigurable DC/DC power converter is configured to operate as a buck converter to reduce the input voltage input into the primary bridge unit.

14. The power system of claim 10, further comprising an inductor connected to a first half bridge unit and a second half bridge unit of the reconfigurable DC/DC power converter, wherein the reconfigurable DC/DC power converter is configured to operate as a boost converter to increase the input voltage input into the primary bridge unit.

15. The power system of claim 10, wherein the energy storage device comprises one of a battery, an ultracapacitor, a fuel cell, or any combination thereof.

16. The power system of claim 10, wherein the power system is for DC to DC and DC to AC applications.

17. The power system of claim 10, wherein the power system is used for AC to DC and AC to AC applications.

* * * * *